(12) United States Patent
Ramberg

(10) Patent No.: US 11,687,807 B1
(45) Date of Patent: Jun. 27, 2023

(54) OUTCOME CREATION BASED UPON SYNTHESIS OF HISTORY

(71) Applicant: Bottomline Technologies (de) Inc., Portsmouth, NH (US)

(72) Inventor: Fred G. Ramberg, North Hampton, NH (US)

(73) Assignee: Bottomline Technologies, Inc., Portsmouth, NH (US)

(*) Notice: Subject to any disclaimer, the term of this patent is extended or adjusted under 35 U.S.C. 154(b) by 945 days.

(21) Appl. No.: 16/452,829

(22) Filed: Jun. 26, 2019

(51) Int. Cl.
*G06Q 40/00* (2023.01)
*G06N 5/04* (2023.01)
*G06Q 40/02* (2023.01)
*G06N 20/00* (2019.01)
*G06F 18/214* (2023.01)

(52) U.S. Cl.
CPC ........... *G06N 5/042* (2013.01); *G06F 18/2148* (2023.01); *G06N 20/00* (2019.01); *G06Q 40/02* (2013.01)

(58) Field of Classification Search
CPC ....... G06Q 40/02; G06K 9/6257; G06N 20/00; G06N 5/04; G06N 5/042
USPC .................................................. 705/4, 35-45
See application file for complete search history.

(56) References Cited

U.S. PATENT DOCUMENTS

| | | | |
|---|---|---|---|
| 5,262,942 A | 11/1993 | Earle | |
| 5,729,594 A | 3/1998 | Klingman | |
| 5,809,483 A | 9/1998 | Broka et al. | |
| 5,815,657 A | 9/1998 | Williams et al. | |
| 5,875,108 A | 2/1999 | Hoffberg et al. | |
| 5,890,140 A | 3/1999 | Clark et al. | |
| 5,913,202 A | 6/1999 | Motoyama | |
| 5,970,482 A | 10/1999 | Pham et al. | |
| 6,023,684 A | 2/2000 | Pearson | |

(Continued)

FOREIGN PATENT DOCUMENTS

| | | |
|---|---|---|
| AU | 2003288790 A1 | 3/2005 |
| CA | 2756619 A1 | 9/2012 |

(Continued)

OTHER PUBLICATIONS

AcceptEasy, "In-Chat Payments", webpage downloaded from https://www.accepteasy.com/en/in-chat-payments on Mar. 21, 2019.

(Continued)

*Primary Examiner* — Jessica Lemieux
*Assistant Examiner* — Mohammed H Mustafa
(74) *Attorney, Agent, or Firm* — Richard Al. Baker, Jr.

(57) ABSTRACT

A method of exercising effective influence over future occurrences using knowledge synthesis is described. Techniques include influencing methods that yield actions, once a proposed outcome has been assumed. This is different from methods, typically referred to as "predictive" or "prescriptive" that use analytics to model future results based upon existing data and predict most likely outcome. One or more methods of analysis of historical data, in a hierarchical manner, determine events which led to an observed outcome. The outcome-based algorithms use, as input, a future event or state and generate attributes that are necessary precursors. By creating these attributes, the future can be affected. Where necessary, synthetic contributors of such attributes are also created and made to act in ways consistent with generating the assumed outcome. These contributors might be called upon respectively, to post favorable opinions, to report balmy weather, or to describe sales to a certain population demographic.

18 Claims, 4 Drawing Sheets

(56) References Cited

U.S. PATENT DOCUMENTS

| | | |
|---|---|---|
| 6,105,012 A | 8/2000 | Chang et al. |
| 6,141,699 A | 10/2000 | Luzzi et al. |
| 6,151,588 A | 11/2000 | Tozzoli et al. |
| 6,400,996 B1 | 6/2002 | Hoffberg et al. |
| 6,505,175 B1 | 1/2003 | Silverman et al. |
| 6,523,016 B1 | 2/2003 | Michalski |
| 6,675,164 B2 | 1/2004 | Kamath et al. |
| 6,687,693 B2 | 2/2004 | Cereghini et al. |
| 6,708,163 B1 | 3/2004 | Kargupta et al. |
| 6,856,970 B1 | 2/2005 | Campbell et al. |
| 7,092,941 B1 | 8/2006 | Campos |
| 7,308,436 B2 | 12/2007 | Bala et al. |
| D593,579 S | 6/2009 | Thomas |
| 7,617,283 B2 | 11/2009 | Aaron et al. |
| 7,716,590 B1 | 5/2010 | Nathan |
| 7,720,763 B2 | 5/2010 | Campbell et al. |
| 7,725,419 B2 | 5/2010 | Lee et al. |
| 7,805,370 B2 | 9/2010 | Campbell et al. |
| 8,229,875 B2 | 7/2012 | Roychowdhury |
| 8,229,876 B2 | 7/2012 | Roychowdhury |
| 8,429,103 B1 | 4/2013 | Aradhye et al. |
| 8,776,213 B2 | 7/2014 | McLaughlin et al. |
| 8,990,688 B2 | 3/2015 | Lee et al. |
| 9,003,312 B1 | 4/2015 | Ewe et al. |
| 9,405,427 B2 | 8/2016 | Curtis et al. |
| D766,292 S | 9/2016 | Rubio |
| D768,666 S | 10/2016 | Anzures et al. |
| 9,489,627 B2 | 11/2016 | Bala |
| 9,537,848 B2 | 1/2017 | McLaughlin et al. |
| D780,188 S | 2/2017 | Xiao et al. |
| D783,642 S | 4/2017 | Capela et al. |
| D784,379 S | 4/2017 | Pigg et al. |
| D784,381 S | 4/2017 | McConnell et al. |
| 9,667,609 B2 | 5/2017 | McLaughlin et al. |
| D785,657 S | 5/2017 | McConnell et al. |
| D790,580 S | 6/2017 | Hatzikostas |
| D791,161 S | 7/2017 | Hatzikostas |
| D803,238 S | 11/2017 | Anzures et al. |
| 9,946,995 B2 | 4/2018 | Dwyer et al. |
| D814,490 S | 4/2018 | Bell |
| 10,262,235 B1 | 4/2019 | Chen et al. |
| D853,424 S | 7/2019 | Maier et al. |
| 10,423,948 B1 | 9/2019 | Wilson et al. |
| D871,444 S | 12/2019 | Christiana et al. |
| D872,114 S | 1/2020 | Schuster |
| D873,277 S | 1/2020 | Anzures et al. |
| D878,385 S | 3/2020 | Medrano et al. |
| D884,003 S | 5/2020 | Son et al. |
| D900,847 S | 11/2020 | Saltik |
| D901,528 S | 11/2020 | Maier et al. |
| D901,530 S | 11/2020 | Maier et al. |
| D902,957 S | 11/2020 | Cook et al. |
| 10,924,514 B1 | 2/2021 | Altman et al. |
| 11,003,999 B1 | 5/2021 | Gil et al. |
| 2002/0016769 A1 | 2/2002 | Barbara et al. |
| 2002/0099638 A1 | 7/2002 | Coffman et al. |
| 2002/0118223 A1 | 8/2002 | Steichen et al. |
| 2002/0135614 A1 | 9/2002 | Bennett |
| 2002/0138431 A1 | 9/2002 | Antonin et al. |
| 2002/0188619 A1 | 12/2002 | Low |
| 2002/0194159 A1 | 12/2002 | Kamath et al. |
| 2003/0041042 A1 | 2/2003 | Cohen et al. |
| 2003/0093366 A1 | 5/2003 | Halper et al. |
| 2003/0184590 A1 | 10/2003 | Will |
| 2003/0212629 A1 | 11/2003 | King |
| 2003/0220844 A1 | 11/2003 | Marnellos et al. |
| 2003/0233305 A1 | 12/2003 | Solomon |
| 2004/0034558 A1 | 2/2004 | Eskandari |
| 2004/0034666 A1 | 2/2004 | Chen |
| 2005/0010575 A1 | 1/2005 | Pennington |
| 2005/0154692 A1 | 1/2005 | Jacobsen et al. |
| 2005/0027645 A1* | 2/2005 | Lui et al. ............... G06Q 40/08 705/38 |
| 2005/0171811 A1 | 8/2005 | Campbell et al. |
| 2005/0177495 A1 | 8/2005 | Crosson Smith |
| 2005/0177504 A1 | 8/2005 | Crosson Smith |
| 2005/0177521 A1 | 8/2005 | Crosson Smith |
| 2006/0015822 A1 | 1/2006 | Baig et al. |
| 2006/0080245 A1 | 4/2006 | Bahl et al. |
| 2006/0101048 A1 | 5/2006 | Mazzagatti et al. |
| 2006/0190310 A1 | 8/2006 | Gudla et al. |
| 2006/0200767 A1 | 9/2006 | Glaeske et al. |
| 2006/0265662 A1 | 11/2006 | Gertzen |
| 2007/0156673 A1 | 7/2007 | Maga et al. |
| 2007/0266176 A1 | 11/2007 | Wu |
| 2008/0104007 A1 | 3/2008 | Bala |
| 2008/0091600 A1 | 4/2008 | Egnatios et al. |
| 2008/0228751 A1 | 9/2008 | Kenedy et al. |
| 2009/0150814 A1 | 6/2009 | Eyer et al. |
| 2009/0192809 A1 | 7/2009 | Chakraborty et al. |
| 2009/0240647 A1 | 9/2009 | Green et al. |
| 2009/0307176 A1 | 12/2009 | Jeong et al. |
| 2010/0066540 A1 | 3/2010 | Theobald et al. |
| 2011/0302485 A1 | 12/2011 | D'Angelo et al. |
| 2012/0041683 A1 | 2/2012 | Vaske et al. |
| 2012/0054095 A1 | 3/2012 | Lesandro et al. |
| 2012/0072925 A1 | 3/2012 | Jenkins et al. |
| 2012/0197795 A1 | 8/2012 | Campbell et al. |
| 2012/0290379 A1 | 11/2012 | Hoke et al. |
| 2012/0290382 A1 | 11/2012 | Martin et al. |
| 2012/0290474 A1 | 11/2012 | Hoke |
| 2012/0290479 A1 | 11/2012 | Hoke et al. |
| 2013/0054306 A1 | 2/2013 | Bhalla et al. |
| 2013/0071816 A1 | 3/2013 | Singh et al. |
| 2013/0110750 A1 | 5/2013 | Newnham et al. |
| 2013/0211937 A1 | 8/2013 | Elbirt et al. |
| 2013/0219277 A1 | 8/2013 | Wang et al. |
| 2013/0231974 A1 | 9/2013 | Harris et al. |
| 2013/0339187 A1 | 12/2013 | Carter |
| 2014/0121830 A1* | 5/2014 | Gromley et al. ....... G06Q 40/12 |
| 2014/0129457 A1 | 5/2014 | Peeler |
| 2014/0143186 A1 | 5/2014 | Bala |
| 2014/0241609 A1 | 8/2014 | Vigue et al. |
| 2014/0244491 A1 | 8/2014 | Eberle et al. |
| 2014/0258104 A1 | 9/2014 | Harnisch |
| 2014/0279484 A1 | 9/2014 | Dwyer et al. |
| 2014/0317502 A1 | 10/2014 | Brown et al. |
| 2015/0363801 A1 | 12/2015 | Ramberg et al. |
| 2016/0011755 A1 | 1/2016 | Douek et al. |
| 2016/0086185 A1 | 3/2016 | Adjaoute |
| 2016/0164757 A1 | 6/2016 | Pape |
| 2016/0232546 A1 | 8/2016 | Ranft et al. |
| 2016/0292170 A1 | 10/2016 | Mishra et al. |
| 2017/0019490 A1 | 1/2017 | Poon et al. |
| 2018/0005323 A1 | 1/2018 | Grassadonia |
| 2018/0025140 A1 | 1/2018 | Edelman et al. |
| 2018/0032908 A1* | 2/2018 | Nagaraju et al. ...... G06N 20/00 |
| 2018/0075527 A1 | 3/2018 | Nagla et al. |
| 2018/0218453 A1* | 8/2018 | Crabtree et al. ....... G06Q 40/08 |
| 2018/0285839 A1 | 10/2018 | Yang et al. |
| 2018/0337770 A1 | 11/2018 | Bathen et al. |
| 2018/0349446 A1 | 12/2018 | Triolo et al. |
| 2019/0122149 A1 | 4/2019 | Caldera et al. |
| 2019/0205977 A1 | 7/2019 | Way et al. |
| 2019/0213660 A1 | 7/2019 | Astrada et al. |
| 2019/0236598 A1 | 8/2019 | Padmanabhan |
| 2019/0258818 A1 | 8/2019 | Yu et al. |
| 2019/0340847 A1 | 11/2019 | Hendrickson et al. |
| 2020/0119905 A1 | 4/2020 | Revankar et al. |
| 2020/0151812 A1 | 5/2020 | Gil et al. |
| 2021/0125272 A1 | 4/2021 | Sinharoy |

FOREIGN PATENT DOCUMENTS

| | | |
|---|---|---|
| EP | 3376361 A2 | 9/2018 |
| JP | 57-101980 A | 6/1982 |
| WO | 2019/021312 A1 | 1/2019 |
| WO | 2020/068784 A1 | 4/2020 |

OTHER PUBLICATIONS

AcceptEasy > Public, webpage downloaded from https://plus.gooogle.com/photos/photo/104149983798357617844/6478597596568340146 on Mar. 21, 2019.

Bansal, Nikhil, Avrim Blum, and Shuchi Chawla. "Correlation clustering." Machine Learning 56.1-3 (2004): 89-113.

(56) References Cited

OTHER PUBLICATIONS

Bloomberg Terminal, Wikipedia, Feb. 20, 2021, webpage downloaded from https://en.wikipedia.org/wiki/Bloomberg_Terminal on Apr. 27, 2021.

Data mining to reduce churn. Berger, Charles. Target Marketing; Philadelphia 22.8 (Aug. 1999): 26-28.

Eckoh, "ChatGuard, The only PCI DSS compliant Chat Payment solution", webpage downloaded from https://www.eckoh.com/pci-compliance/agent-assisted-payments/ChatGuard on Mar. 25, 2019.

Finley, Thomas, and Thorsten Joachims. "Supervised clustering with support vector machines." Proceedings of the 22nd international conference on Machine learning, ACM, 2005.

Hampton, Nikolai, Understanding the blockchain hype: Why much of it is nothing more than snake oil and spin, Computerworld, Sep. 5, 2016.

Khalid, "Machine Learning Algorithms 101", Feb. 17, 2018 https://towardsml.com/2018/02/17/machine-learning-algorithms-101/ (Year: 2018).

Live chat Screenshots, mylivechat, webpage downloaded May 17, 2021 from https://mylivechat.com/screenshots.aspx.

LiveChat, "Pagato", webpage downloaded from https://www.livechatinc.com/marketplace/apps/pagato/ on Mar. 21, 2019.

ManyChat, "[UPDATED] Accept Payments Directly in Facebook Messenger Using ManyChat!", webpage downloaded from https://blog.manychat.com/manychat-payments-using-facebook-messenger/ on Mar. 21, 2019.

McConaghy, Trent, Blockchains for Artificial Intelligence, Medium, Jan. 3, 2017.

Meia et al., Comparing clusterings-an information based distance, Journal of Multivariate Analysis 98 (2007) 873-895.

Mining for gold. Edelstein, Herb. InformationWeek; Manhasset 627 (Apr. 21, 1997): 53-70.

Pagato, "Accept Payments via Chat", webpage downloaded from https://pagato.com/ on Mar. 21, 2019.

PCIpal, "SMS & Web Chat", webpage downloaded from https://www.pcipal.com/us/solutions/sms-web-chat/ on Mar. 21, 2019.

The Clearing House, "U.S. Real-Time Payments Technology Playbook", Version 1.0, Nov. 2016.

Traffic Analysis of a Web Proxy Caching Hierarchy. Anirban Mahanti et al., University of Saskatchewan, IEEE Network, May/Jun. 2000.

Uhingran, Anant, "Moving toward outcome-based intelligence", IDG Contributor Network, Mar. 19, 2018.

James Wilson, "How to take your UX to a new level with personalization", Medium blog, Oct. 24, 2018, found at https://medium.com/nyc-design/how-to-take-your-ux-to-a-new-level-with-personalization-1579b3ca414c on Jul. 29, 2019.

"Distributed Mining of Classification Rules", By Cho and Wuthrich, 2002 http://www.springerlink.com/(21nnasudlakyzci-civ54i5kxz0)/app/home/contribution.asp?referrer=parent&backckto=issue,1,6;journal,2,3,31;linkingpublicationresults,1:105441,1.

\* cited by examiner

OUTCOME CREATION BASED UPON SYNTHESIS OF HISTORY

BACKGROUND

Prior Application

This application is a priority application.

Technical Field

The system, apparatuses and methods described herein generally relate to machine learning techniques, and, in particular, to creating desired outcomes using predictive analytics and the synthesis of events.

Description of the Related Art

Machine learning and artificial intelligence algorithms are seen in the computer science literature for the past half century, with slow progress seen in the predictive analytics realm. We can now take a large data set of various features, and process that learning data set through one of a number of learning algorithms to create a rule set based on the data. This rule set can reliably predict what will occur for a given event. For instance, in a fraud prediction application, with a given event (set of attributes), the algorithm can determine if the transaction is likely to be fraudulent.

Machine learning is a method of analyzing information using algorithms and statistical models to find trends and patterns. In a machine learning solution, statistical models are created, or trained using historical data. During this process, a sample set of data is loaded into the machine learning solution. The solution then finds relationships in the training data. As a result, an algorithm is developed that can be used to make predictions about the future. Next, the algorithm goes through a tuning process. The tuning process determines how an algorithm behaves in order to deliver the best possible analysis. Typically, several versions, or iterations of a model are created in order to identify the model that delivers that most accurate outcomes.

Generally, models are used to either make predictions about the future based on past data, or discover patterns in existing data. When making predictions about the future, models are used to analyze a specific property or characteristic. In machine learning, these properties or characteristics are known as features. A feature is similar to a column in a spreadsheet. When discovering patterns, a model could be used to identify data that is outside of a norm. For example, in a data set containing payments sent from a bank, a model could be used to identify unusual payment activity that may indicate fraud.

Once a model is trained and tuned, it is typically published or deployed to a production or QA environment. In this environment, data is often sent from another application in real-time to the machine learning solution. The machine learning solution then analyzes the new data, compares it to the statistical model, and makes predictions and observations. This information is then sent back to the originating application. The application can use the information to perform a variety of functions, such as alerting a user to perform an action, displaying data that falls outside of a norm, or prompting a user to verify that data was properly characterized. The model learns from each intervention and becomes more efficient and precise as it recognizes patterns and discovers anomalies.

An effective machine learning engine can automate development of machine learning models, greatly reducing the amount of time spent reviewing false positives, call attention to the most important items, and maximizes performance based on real-world feedback.

However, machine learning techniques look to the past to predict the future. They are passive algorithms, incapable of creating an action. What if, given a learning data set, one wanted to create a certain outcome? Present teachings on machine learning fail to disclose how to use a machine learning data set to create a desired outcome.

BRIEF SUMMARY OF THE INVENTION

A method for creating a desired outcome is described herein. The method is made up of the steps of (1) inputting the desired outcome on a computer; (2) sending the desired outcome to a machine learning server over a network; (3) parsing rules in a machine learning model to determine a set of necessary-past attributes for creating the desired outcome, on the machine learning server; (4) filtering the set of necessary-past attributes through a list of synthetic features to create synthetic contributors; (5) determining the synthetic contributors required to create the desired outcome; and (6) outputting the synthetic contributors.

In some embodiments, the method also includes the step of creating the machine learning model by operating a training module on a machine learning database. The method could also include the step of creating the desired outcome by automatically taking action to implement the synthetic contributors. In some cases, the desired outcome relates to banking. And the synthetic contributors could include information about bank accounts. In some embodiments the synthetic contributors are output to the computer and in others the synthetic contributors are output to software on the machine learning server. The parsing of the rules could include reverse engineering of the machine learning model. The list of synthetic features could be machine generated. The method could also include the step of locating the desired outcome in a set of machine learning data and creating a dataset for the machine learning model with data proximate to the desired outcome.

A device for creating a desired outcome is also described in this document. The device is made up of a machine learning database electrically connected to a special purpose machine learning server, where the special purpose machine learning server has a list of synthetic features. The special purpose machine learning server accepts an input of the desired outcome, and sends the desired outcome to an outcome creation engine. The outcome creation engine parses the rules of a machine learning model to derive a set of necessary-past attributes. The set of necessary-past attributes are filtered through the list of synthetic features to determine synthetic contributors required to create the desired outcome.

The machine learning model could be created by operating a training module on the machine learning database. In some embodiments, the desired outcome is created by automatically taking action to implement the synthetic contributors. In some cases, the desired outcome relates to banking. And the synthetic contributors could include information about bank accounts. In some embodiments the synthetic contributors are output to the computer and in others the synthetic contributors are output to software on the machine learning server. In some cases, the rules of the machine learning model are reverse engineered to derive the set of necessary-past attributes.

DETAILED DESCRIPTION

Figure 1:
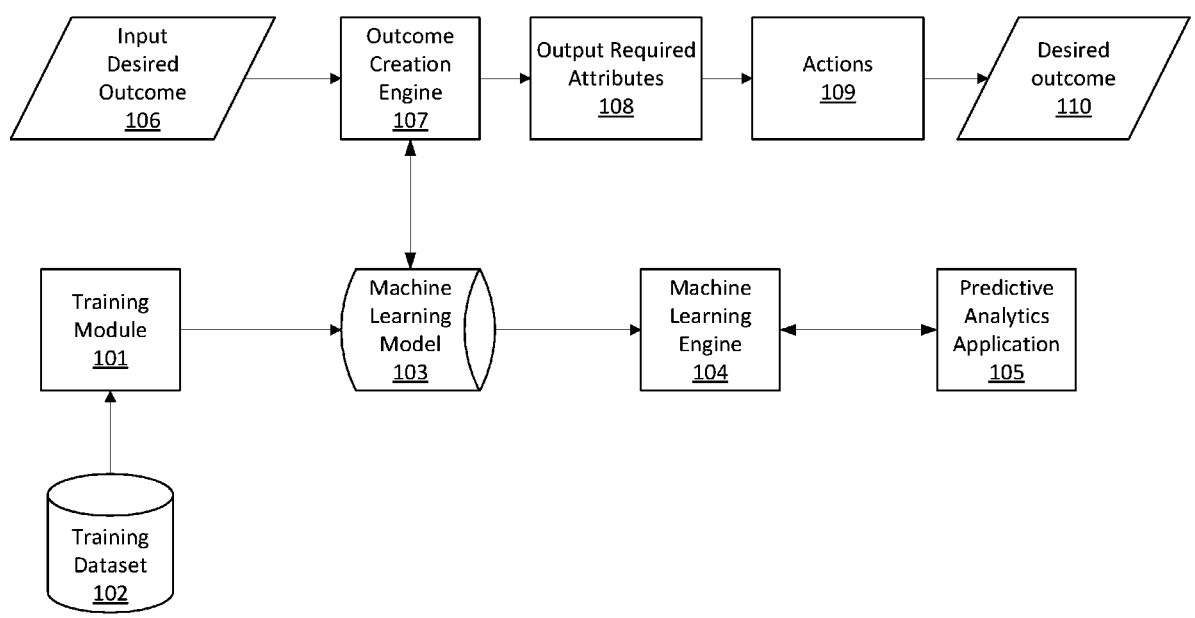
FIG. 1 is a block diagram of the component for outputting the attributes required for creating the desired outcome.

The inventions herein relate to exercising effective influence over future occurrences using knowledge synthesis. Techniques have been invented and combined with certain others to achieve innovative influencing methods that yield actions 206, once a proposed outcome 106 has been assumed. This is different from methods, typically referred to as "predictive" or "prescriptive" that use analytics to model future results 103 based upon existing data 102 and predict most likely outcome 105 based upon natural or planned actions: "if-then" results. The inventions use one or more established methods of analysis of historical data 102 to determine, in a hierarchical manner, the events which led to an observed outcome. The outcome based algorithms 107 then use, as input, a cast future event or state 106 and generate a set of attributes 108, 202 that are necessary precursors. By creating these attributes 202, or the appearance of their creation, the future can be affected. Where necessary, synthetic contributors 205 of such attributes are also created and made to act in ways consistent with generating the assumed outcome 106. Examples of synthetic contributors 204 are composite personalities, fictitious physical sensors and undocumented sales channels. These contributors might be called upon respectively, to post favorable opinions, to report balmy weather, or to describe sales to a certain population demographic as being "off the charts." These synthesized data 205 make up the history, or "necessary-past," resulting in the outcome. The outcome occurs in the environment 201.

An outcome is the final state of sentiment, ranking and/or binary result, from all of those possible, in the future. Influence is information, action and/or expression of sentiment that determines an outcome. Typically, historical data 102 is used to predict an outcome based upon measurable attributes leading to a foreseeable state. Conversely, if an outcome is assumed or created, then specific attributes necessary, referred to herein after as a necessary-past, can be generated synthetically and applied to affect the result.

Sheep are often influenced to an outcome by very few attributes. One well trained dog can herd several hundred sheep in a desired manner using three attributes, barking, nipping and position/motion. The herd could easily overwhelm a single dog with only barking, nipping and running as attributes at his disposal. The dog learns from previous data, which sheep to move first and the attribute most likely to influence the motion. Having moved very few of the herd, the dog then relies upon their influence upon each other to get the entire group moving in the desired direction, leaving him to only deal with outliers. The dog has created the future as opposed to forecasting it.

Supervised classification of data and patterns is used to identify attributes that influence historical outcomes, in context. By example, if a Company has released a new candy bar and determines that the outcome is that consumers like it, attributes will be determined from analysis of data from a different, but similar product release where the result was that the product was liked. This modeling, used to determine the influencing attributes, is done using best-known-methods in data aggregation, mining and analysis.

Figure 2:
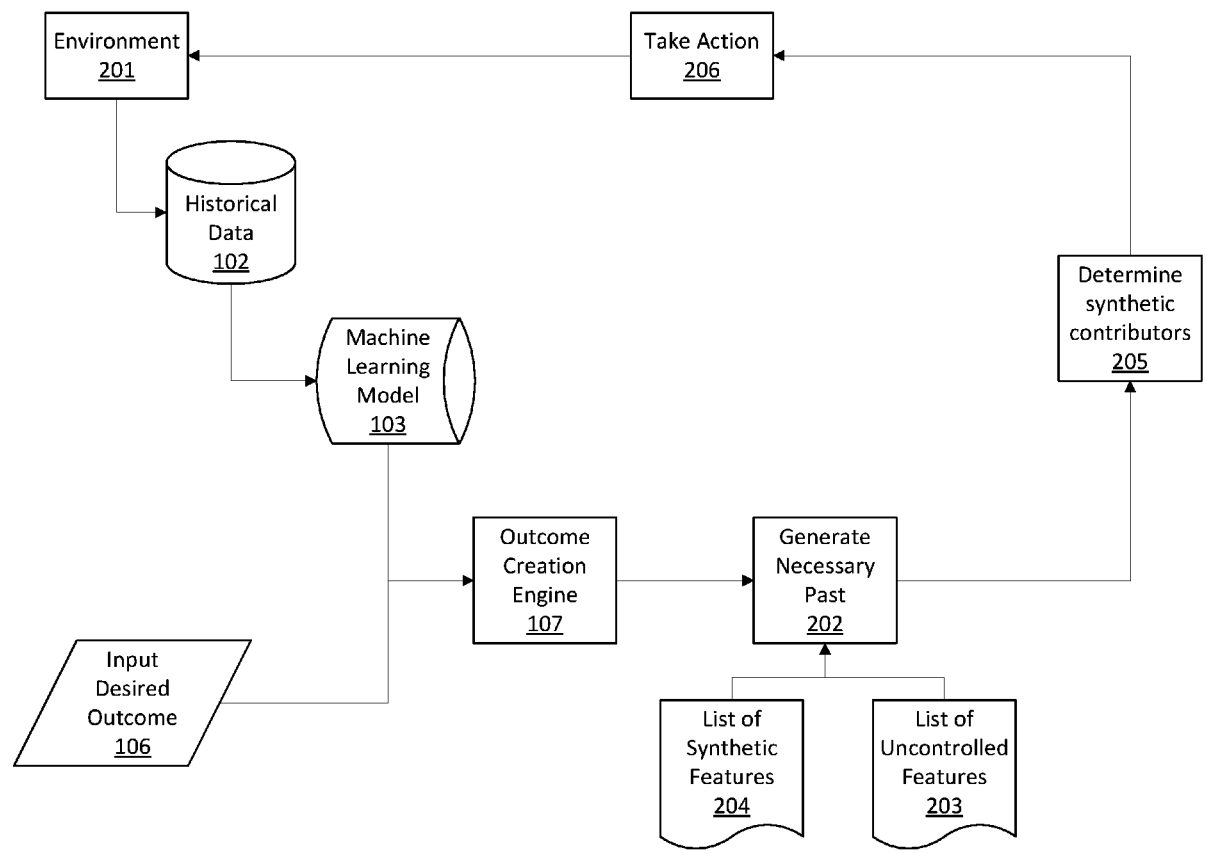
FIG. 2 is a block diagram showing the loop of the environment is impacted by the creations of the desired outcome.

A synthetic influencer, according to the invention, can effectively cause a future occurrence by offering specific attributes necessary to exist prior to the outcome. FIG. 2 illustrates this process; a candy maker prefers that social media comments reflect that a new bar is well liked and this is identified as the future occurrence, "bar is well liked". This well liked outcome is the desired outcome 106. Data 102 is gathered and used in FIG. 2 to show that several attributes are necessary to achieve this outcome 106; using reaction to prior and competing products, a map of influencers is identified along with their characteristics, a relatively small number of whom were likely required to move a vast number of followers to an equivalent conclusion and expression of sentiment. The algorithm then assigns synthetic members from its database to express attribute values that are designed to move the required volume of sentiment in the direction consistent with the assumed outcome.

Examples of practical applications for creation of the future by generating the necessary-past and contributing synthesized attributes include:
  Successful product launch;
  Positive reputation;
  Increased awareness;
  Candidate election;
  Stock sentiment;
  Tourism increase;
  Web site traffic;
  Redirection of resources.

The core algorithms of a future creating inventions build a synthetic history of attributes necessary for the achievement of the future state. Further, the algorithm creates and assigns influencers, based upon learned characteristics, to implement the synthetic history 206. In other words, for the future to have a specified, as opposed to an observed or predicted, state, certain things must have occurred prior to the outcome; the algorithm determines those things necessary to create the future and directs the deployment thereof.

Creating the necessary-past 202 is done using available analysis algorithms and techniques 103, 107 which are scored for the type of data available. The attributes of the necessary-past are determined and scored or weighted as required by context and then shaped; such results are gained through the analysis of historical data 102 from physical sensors, sentiment data from social media, collected sales/revenue figures, voter preference, polls etc.

From the analysis above, algorithms are used to discover specific influencers along with the weighted effect of such influence 205. Characteristics such as demographics, persuasions, climate, top sellers, etc. are described. Synthetic influencers are then selected or constructed to output data consistent with the future as cast. The result can be described as a "then-if" solution.

Finally, the invention directs the deployment of the synthetic influencers described above, ordered in time and adjusted in magnitude, as determined by internal algorithms 206. The outcome is tested and influence or influencers may or may not be modified or substituted.

Current prescriptive analytic techniques present "if-then" results. Such results rely upon the observed past to test the result of one or multiple occurrences and determine a likely outcome.

There are four fundamental and multiple secondary components to the algorithm:
- The first basic component is a means and method to Extract, Transform and Load (ETL) historical data 102 from disparate sources, in terms of format, location, etc 201;
- The second component uses predictive analytic algorithms 101 to generate models 103 from the data 102 and to identify attributes as part of a necessary-past 202 of the outcome;
- The third component allows the future outcome to be entered in to the algorithm and generates the values, in their native format, for the attributes of a necessary-past 205;
- The fourth fundamental component of the algorithm identifies the synthetic offerers from its internal database that will contribute the attributes.

A major secondary component of the inventions is the database of synthetic contributors 204 whose characteristics result in very few being required to create and demonstrate a necessary past. Other secondary components of the invention include a means to build the synthetic contributors using knowledge derived from examination of, assumed-real contributors identified as being necessary influencers in the previously described historical models.

The inputs to the algorithm are therefore, the future as cast, historical data 102 collected that yielded a contextually similar result and the output is a necessary-past, its attributes and the contributors thereof.

Looking to FIG. 1, a block diagram is shown for a traditional machine learning predictive analytics application. To this application, the output creation features are added. In a traditional predictive analytics system, a training module 101 operates on a training dataset 102 to create a machine learning model 103. The predictive analytics application 105 calls the machine learning engine 104 with a specific set of event data. The machine learning engine 104 processes the event data through the machine learning model 103 to predict what result will occur with the specific event data.

In the outcome creation portion of the system starts with the input of the desired outcome 106. Say a banker wants to increase the number of short term business loans. The system is asked to increase business loans as the outcome. This outcome is sent to the outcome creation engine 107. The outcome creation engine 107 reverse engineers the machine learning model 103 to identify the feature drivers of the model 103. Say the model 103 has rules that if a bank customer has a checking account with the bank and uses the debit card and has a balance of less than $20,000 in the checking account, then the customer is likely to ask for a short term loan. The outcome creation engine 107 parses the rules of the machine learning model 103, and returns checking account, debit card, and balance less than $20,000.

The bank cannot control the amount of money in the account, so this is an uncontrolled feature 203. But the bank can influence the presence of a checking account and the use of a debit card, perhaps by offering discounts or increased advertising. So the output creation engine 107 outputs 108 1) the presence of a checking account and 2) use of debit card. In some embodiments, the balance less than $20,000 is also output 108. The output 108 is the transfer of data to other software in some embodiments and in other embodiments the output 108 may be displayed on a screen, perhaps on the computer 301. In other embodiments, the output 108 causes actions to be taken 109. In some embodiments, the server 303 matches the required attributes 108 to a table of actions to take to cause the required attributes. For instance, this could include lowering the price when increased sales are desired. Or buying products to cause a price to increase. All of these actions 109 are automated within the server.

Once the actions 109 are taken, the desired outcome 110 is effectuated.

FIG. 2 shows a broader view of embodiments of the present inventions. The environment 201 is the context upon which the machine learning operates and upon which the algorithm seeks to impact with a desired output 106. In our example above, the environment 201 is the banking market. From the market environment 201, historical data 102 is collected. This historical data 102 could include features such as customer name, address, the types of accounts and loans that the customer has, balances, etc. This historical data 102 is run through the training module 101 to build the machine learning model 103. The machine learning model 103 and the desired outcome 106 are fed into the outcome creation engine 107 to determine what is needed to generate the set of necessary-past attributes 202. Returning to our example, the machine learning model 103 may determine that it uses the presence of a checking account, the use of a debit card, and a balance of less than $20,000 to predict if a customer will request a short term loan. The outcome creation engine 107 determines that checking account, debit card, and balance less than $20,000 are needed to generate the set of necessary-past attributes 202. The set of necessary-past attributes 202 looks to the two features lists, one list of synthetic features 204 and the second list of uncontrolled features 203. The set of necessary-past attributes 202 are filtered through the list of synthetic features 204. In some embodiments, these features lists 203, 204 are maintained by the machine using machine learning techniques. In other embodiments, these lists 203, 204 are entered by the banker or those setting up the system.

The determine synthetic contributors function 205 then take the features that are controllable by the bank, in this case the checking account and of the debit card, and determines the required attributes. In this case, the algorithm looks for the presence of these features. In other situations, it could be certain values of a feature. In some embodiments, the controllable features are tested to see if they have a determinative effect, and are not overridden by the uncontrolled features.

The list of desired attributes for the controllable features are then either automatically sent to cause an action 206 or sent to a human for implementation. In our example, the debit card could be automatically sent out to existing customers with checking accounts and balances less than $20,000 to setup the attributes for the desired outcome. However, the opening of the checking account may require the bank to design and implement an advertising campaign to bring in more checking accounts. Each of these actions 206 will impact the environment 201.

Figure 3:
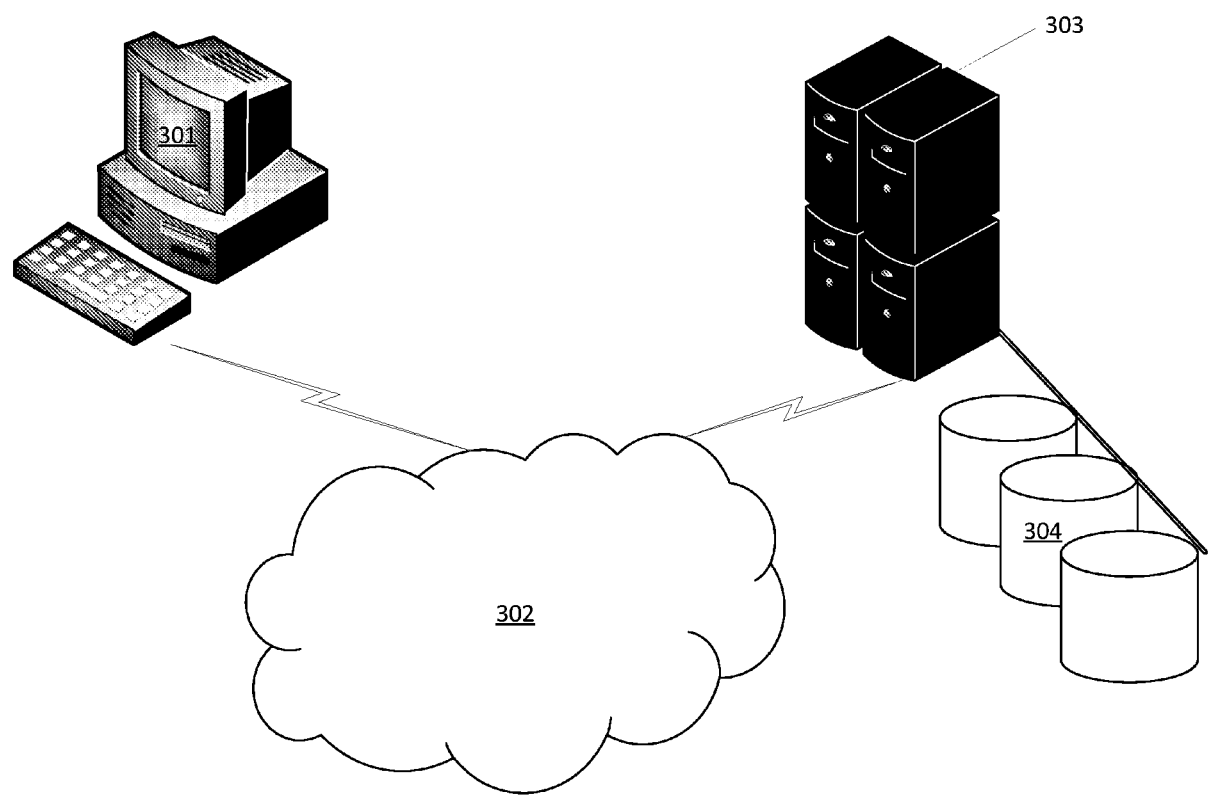
FIG. 3 is a diagram of one possible hardware environment for operating the outcome creation engine.

Because of the complexities of machine learning algorithms, special purpose computing may be needed to build and execute the machine learning model described herein. FIG. 3 shows one such embodiment. The user enters the desired outcome 106 and perhaps views the output 108 described here on a personal computing device such as a personal computer, laptop, tablet, smart phone, monitor, or similar device 301. The personal computing device 301 communicates through a network 302 such as the Internet, a local area network, or perhaps through a direct interface to the server 303. The special purpose machine learning server 303 is a high performance, multi-core computing device with significant storage facilities 304 in order to store the machine learning training data 102 for the model 103. Since this machine learning database 102 is continuously updated in some embodiments, this data must be kept online and accessible so that it can be updated. In addition, the real-time editing of the model 103 as the user provides feedback to the model 103 requires significant processing power to rebuild the model as feedback is received. The server 303 is a high performance computing machine electrically connected to the network 302 and to the storage facilities 304.

Figure 4:
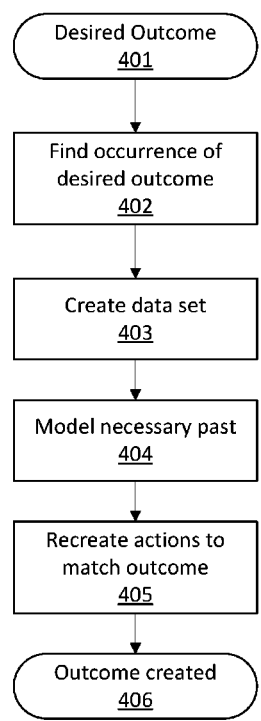
FIG. 4 is a flow chart of the outcome creation process.

Looking to FIG. 4, a flowchart is shown creating a desired outcome. The process begins by identifying the desired outcome 401. Knowing what is desired, the process next looks through the data for an existing outcome in history 402. In this step 402, the exact occurrence is sought in the data.

Figure 5:
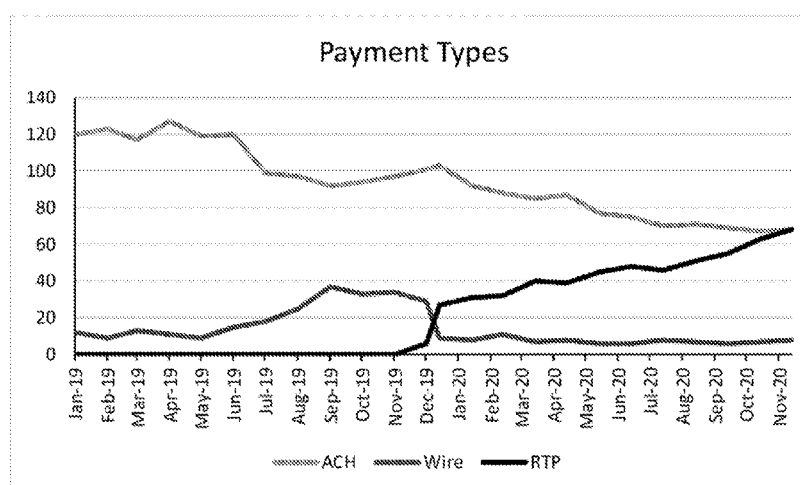
FIG. 5 is a chart of a banking example of finding a necessary past.

In the example in FIG. 5, the desired outcome is to increase the number of Real Time Payments made by a customer. In this example, we assume that the typical customer does about 90% of their transactions as Automated Clearing House (ACH) payments, typically for a nominal or no cost. About 10% of the payments are done with wire transfers, for a substantial cost per transaction (maybe $25 per wire). A new payment method called Real Time Payment (RTP) is introduced at a moderate price, perhaps $2 per transaction. The desired outcome 401 is to transition customers from ACH to RTP payments. In FIG. 5, a customer has been identified who converted a significant amount of their business from ACH to RTP. In one embodiment, this customer was found by the server 303 by searching for customers who have more RTP payments than ACH payments. In some embodiments, rather than a single customer an aggregate of a plurality of customers could be charted. In some embodiments this aggregation is simply time based, and in other embodiments, the time is shifted to align the desired outcomes.

In the chart on FIG. 5, the change from no RTP payments to many RTP payments started in November or December 2019. So the server 303 identifies the occurrence of the desired outcome 402 as December 2019, by comparing the RTP data point to see where a sharp increase occurs.

The next step in FIG. 4 is to create a data set 403 for a period of time leading up to the desired change. This time period could be a parameter set by a user or it could be determined by repeatedly creating models 404 and testing the results to see if an interesting result is produced. After the data set 403 is determined, the necessary part is modeled 404 using traditional machine learning techniques used for predictive analytics.

In our example in FIG. 5, the one year period is selected, and the data set 403 is marked as from January 2019 to December 2019. A machine learning model is run on the 2019 data, looking at the number of ACH payments, the number of wire payments, and the number of RTP payments. The machine learning model 404 notices that in the six months before the desired outcome on December 2019, the number of ACH payments decreased and the number of wire payments increased. Essentially, the model notices that before the RTP payments were used by the customer, the customer started switching to a greater percentage of wire transfers for 5-6 months, and then the customer moved to RTP payments.

In FIG. 4, the process then identifies the actions to take to match the outcome 405, effectuating the desired outcome 406.

In the example in FIG. 5, the server 303 identifies that an increase in wire transfers will cause the customer to consider RTP as a method of payment. The server 303 then searches a list of possible actions for an action that will increase wire transfers. For example, the server 303 may determine that a significant sale on wire transfers may cause a change in the mix of wires and ACH payments. By significantly discounting wire transfers, perhaps to several dollars for a temporary sale, the customer switches over a number of payments from ACH to wire. Then when the wire transfer sale ends, the bank recommends that RTP payments be used instead of wires. This will match the chart in FIG. 5 for another customer.

The foregoing devices and operations, including their implementation, will be familiar to, and understood by, those having ordinary skill in the art.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The invention claimed is:

1. A method for identifying synthetic contributors required to generate a desired outcome, the method comprising:
   creating a machine learning model by operating a training module on a machine learning database on a machine learning server;
   receiving the desired outcome at the machine learning server over a network from a computer;
   reverse engineering the machine learning model by parsing rules in the machine learning model using the desired outcome to determine a set of necessary-past attributes for generating the desired outcome, on the machine learning server, where the necessary-past attributes are data and pattern attributes that need to be present when the machine learning model is run to generate the desired outcome;
   filtering the set of necessary-past attributes through a list of synthetic features to identify the synthetic contributors required to generate the desired outcome, wherein the synthetic features are features input to the machine learning model that can be controlled and the synthetic contributors are presence or value attributes of the machine learning model that can be made to act in a way to generate the desired outcome; and
   outputting the synthetic contributors.

2. The method of claim 1 wherein the desired outcome relates to web site traffic.

3. The method of claim 1 further comprising:
   generating the desired outcome by automatically taking action to implement the synthetic contributors.

4. The method of claim 1 wherein the desired outcome relates to banking.

5. The method of claim 4 wherein the synthetic contributors include information about bank accounts.

6. The method of claim 1 wherein the synthetic contributors are output to the computer.

7. The method of claim 1 wherein the synthetic contributors are output to software on the machine learning server.

8. The method of claim 1 wherein the list of synthetic features is machine generated.

9. The method of claim 1 further comprising locating the desired outcome in a set of machine learning data and creating a dataset for the machine learning model with data proximate to the desired outcome.

10. A device for identifying synthetic contributors required to generate a desired outcome, the device comprising:

a special purpose machine learning server;
a machine learning database electrically connected to the special purpose machine learning server; and
a list of synthetic features stored in the special purpose machine learning server, where the synthetic features are features input to a machine learning model that can be controlled;
wherein the special purpose machine learning server creates the machine learning model by operating a training module on the machine learning database on the machine learning server, accepts an input of the desired outcome, and uses the desired outcome in conjunction with an outcome creation engine to reverse engineer the machine learning model by parsing rules of the machine learning model using the desired outcome to derive a set of necessary-past attributes, the set of necessary-past attributes filtered through the list of synthetic features to identify the synthetic contributors required to generate the desired outcome, where the necessary-past attributes are data and pattern attributes that need to be present when the machine learning model is run to generate the desired outcome and the synthetic contributors are presence or value attributes of the machine learning model that can be made to act in a way to generate the desired outcome.

11. The device of claim 10 wherein the desired outcome relates to web site traffic.

12. The device of claim 10 wherein the desired outcome is generated by automatically taking action to implement the synthetic contributors.

13. The device of claim 10 wherein the desired outcome relates to banking.

14. The device of claim 13 wherein the synthetic contributors includes information about bank accounts.

15. The device of claim 10 wherein the synthetic contributors are shared with other software on the special purpose machine learning server.

16. The device of claim 10 wherein the synthetic contributors are output on a display.

17. The device of claim 10 wherein the list of synthetic features is machine generated.

18. A device for generating a desired outcome, the device comprising:
a special purpose machine learning server; and
a machine learning database electrically connected to the special purpose machine learning server;
wherein the special purpose machine learning server comprises:
a means for creating a machine learning model by operating a training module on the machine learning database on the machine learning server; and
a means for generating the desired outcome using the machine learning model.

* * * * *